July 24, 1923.
D. McC. HUDSON
1,463,084
REPAIR DEVICE FOR FISHING RODS
Filed Sept. 8, 1921
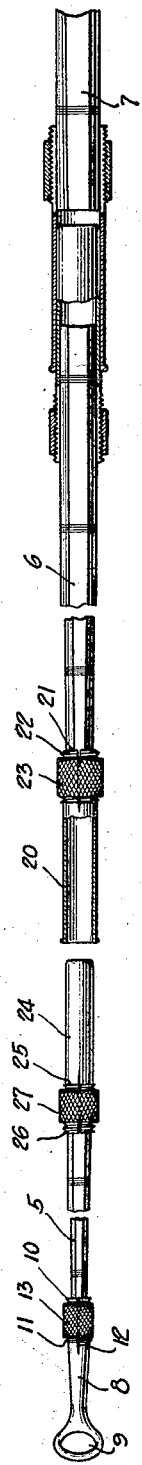
WITNESSES
Frederick Diehl.
P.H.Pattison.
INVENTOR
DONALD McCORMACK HUDSON
BY Munn&Co.
ATTORNEYS Patented July 24, 1923.

1,463,084

UNITED STATES PATENT OFFICE.

DONALD McCORMACK HUDSON, OF BEND, OREGON.

REPAIR DEVICE FOR FISHING RODS.

Application filed September 8, 1921. Serial No. 499,237.

*To all whom it may concern:*

Be it known that I, DONALD McCORMACK HUDSON, a citizen of the United States, and a resident of Bend, in the county of Deschutes and State of Oregon, have invented a new and Improved Repair Device for Fishing Rods, of which the following is a full, clear, and exact description.

The present invention relates to new and useful improvements in repair devices for fishing rods and while the same is especially designed for use in connection with fishing rods, it is obvious that the same principle and construction may be applied to other devices wherein joints of the telescoping type are employed.

It is one of the primary objects of the present invention to provide means by which repairs to fishing rods and similar articles may be made when these articles become broken.

It is a further object of the invention to provide means whereby the tips, ferrules, and the like, of fishing rods and similar articles may be securely fastened in place in such a manner that they may be readily removed when desired.

It is a further object of the invention to provide a device of this character which is so constructed as to render it readily portable and capable of being carried within the butt end of the rod handle when not in use.

With the above and other objects in view, reference is had to the accompanying drawings, in which—

The figure is a view partly in elevation and partly in section of a fishing rod constructed in accordance with the present invention.

The rod illustrated in the drawings is of the three-joint type and in said drawings, the reference character 5 designates the tip, 6, the intermediate section, and 7, the handle or butt section. The reference character 8 designates the tip guide and said tip guide is provided with an eye 9 on one of its ends, through which the line is adapted to run in use. The opposite end of the tip guide 8 is formed with a socket 10, and said socket 10 is externally screw-threaded as at 11. This socket member 10 is provided at diametrically opposite points with slots 12 or the like, which construction provides a socket of resilient nature. Surrounding the socket 10 and having threaded engagement with the external threads 11 thereof, is a sleeve 13, and said sleeve is preferably knurled or otherwise roughened in order that a firmer grip thereon may be obtained.

In the ordinary construction of fishing rods, the tip guide is permanently secured to the tip section by receiving the outer end of the tip section in the socket formed thereon and passing a rivet through both the tip guide and the tip. When this tip member breaks, however, it is necessary to remove the broken part thereof from the socket, and owing to the taper of the tip member even when the broken portion is removed, the socket will not receive the free end of the tip member.

By the construction illustrated in the present application, however, the socket being of a resilient nature, is free to expand when the end of the tip is inserted therein, and the knurled sleeve 13 when caused to engage with the threads 11 of the tip guide 8 will cause the resilient socket to grip the tip member to retain the tip guide in place thereon.

While in the present instance the description of the invention has been confined to the tip guide 8, it is obvious from the drawings that the telescoping joints may each be constructed in this manner, that is, the socket member 20 of said telescoping joints may be split as at 21 and threaded as at 22, for engagement with a knurled ring 23 in order that said sockets may be clamped upon the several rod sections should they become broken, and the ferrule members 24 may likewise be split as indicated by the reference character 25 and screw-threaded as at 26 to receive a knurled ring 27, by means of which they may be secured to the several rod sections if any of them should become broken adjacent the ferrule end instead of the socket end, thus providing for the repair of the rod with the least possible waste.

I claim:

A repair device for fishing rods comprising a socket member and a ferrule member, said ferrule member being adapted for reception within said socket member, and means for attaching each of said members to its respective broken part of a fishing rod, said means consisting of a plurality of kerfs formed in the socket member and the ferrule member whereby the same are expansible to receive rods of various diameters and a collar adapted to be received by each of said members and to contract its split portion about its respective section of the fishing rod to which it is attached and cause the split portion to grip the rod to secure the respective members in position thereon.

DONALD McCORMACK HUDSON.